(12) United States Patent
Philpott et al.

(10) Patent No.: US 11,649,864 B2
(45) Date of Patent: May 16, 2023

(54) DISC BRAKE ASSEMBLY HAVING A SENSOR ASSEMBLY ATTACHED TO A RETRACTION SPRING

(71) Applicant: ArvinMeritor Technology, LLC, Troy, MI (US)

(72) Inventors: Daniel Philpott, Troy, MI (US); Alex Adkins, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 99 days.

(21) Appl. No.: 17/345,179

(22) Filed: Jun. 11, 2021

(65) Prior Publication Data

US 2022/0397172 A1 Dec. 15, 2022

(51) Int. Cl.
| | |
|---|---|
| *F16D 65/02* | (2006.01) |
| *F16D 65/097* | (2006.01) |
| *B60R 16/02* | (2006.01) |
| *B60T 1/06* | (2006.01) |
| *F16D 55/225* | (2006.01) |
| *F16D 65/00* | (2006.01) |
| *F16D 55/00* | (2006.01) |
| *F16D 127/02* | (2012.01) |

(52) U.S. Cl.
CPC ...... *F16D 65/0972* (2013.01); *B60R 16/0207* (2013.01); *B60T 1/065* (2013.01); *F16D 55/225* (2013.01); *F16D 65/0068* (2013.01); *F16D 2055/0029* (2013.01); *F16D 2127/02* (2013.01)

(58) Field of Classification Search
CPC ............. F16D 65/0972; F16D 65/0975; F16D 65/0977; F16D 55/225; F16D 65/0068; F16D 2055/0029; F16D 2127/02; B60R 16/0207; B60T 1/065
USPC ............ 188/1.11 E, 1.11 L, 1.11 R; 340/454; 116/208
See application file for complete search history.

(56) References Cited

U.S. PATENT DOCUMENTS

| | | | | |
|---|---|---|---|---|
| 4,491,204 A | * | 1/1985 | Dirauf | F16D 65/0975 188/73.38 |
| 4,677,420 A | * | 6/1987 | Topic | F16D 65/0977 188/1.11 R |
| 5,511,638 A | | 4/1996 | Tsuruta | |
| 5,513,726 A | * | 5/1996 | Thompson | F16D 66/021 340/454 |
| 5,549,181 A | | 8/1996 | Evans | |

(Continued)

FOREIGN PATENT DOCUMENTS

| | | |
|---|---|---|
| DE | 19505318 A1 | 8/1996 |
| DE | 102018114396 A1 | 12/2019 |

(Continued)

OTHER PUBLICATIONS

U.S. Appl. No. 16/788,556, filed Feb. 12, 2020; 32 Pages.

(Continued)

*Primary Examiner* — Christopher P Schwartz
(74) *Attorney, Agent, or Firm* — Brooks Kushman PC

(57) ABSTRACT

A disc brake assembly that includes at least one brake pad retraction spring and a sensor assembly. The brake pad retraction spring extends between a pair of brake pad assemblies. The sensor assembly includes at least one sensor and a wire harness. The sensor is disposed on a brake pad assembly. The wire harness is attached to the brake pad retraction spring.

22 Claims, 14 Drawing Sheets

(56) References Cited

U.S. PATENT DOCUMENTS

| | | | |
|---|---|---|---|
| 8,393,441 B2 | 3/2013 | Gutelius | |
| 8,857,575 B2 | 10/2014 | Philpott | |
| 10,309,470 B1 | 6/2019 | Philpott | |
| 11,313,427 B2* | 4/2022 | Krause | B60T 17/04 |
| 2016/0160949 A1* | 6/2016 | Philpott | F16D 65/568 |
| | | | 188/71.9 |
| 2018/0106309 A1 | 4/2018 | Fricke et al. | |
| 2018/0106313 A1 | 4/2018 | Fricke et al. | |
| 2019/0217671 A1* | 7/2019 | Bates | B60C 23/04 |
| 2019/0293133 A1 | 9/2019 | Brandl et al. | |
| 2020/0355232 A1 | 11/2020 | Adkins et al. | |
| 2021/0246952 A1* | 8/2021 | Adkins | F16D 65/0975 |
| 2022/0049747 A1* | 2/2022 | Cleary | F16D 55/225 |

FOREIGN PATENT DOCUMENTS

| | | |
|---|---|---|
| DE | 102018120512 A1 | 2/2020 |
| EP | 1 241 369 A2 | 9/2002 |
| EP | 2 557 330 A1 | 2/2013 |
| EP | 3736462 A1 | 11/2020 |
| GB | 2257483 A | 1/1993 |
| JP | H0292130 U | 7/1990 |
| JP | 2003148525 A | 5/2003 |
| JP | 2009127715 A | 6/2009 |
| JP | 2012189188 A | 10/2012 |
| WO | 2014097098 A1 | 6/2014 |
| WO | 2017060515 A1 | 4/2017 |
| WO | 2018/234665 A1 | 12/2018 |
| WO | 2018234665 A1 | 12/2018 |
| WO | 2019/068619 A1 | 4/2019 |
| WO | 2020164885 A1 | 8/2020 |

OTHER PUBLICATIONS

Adkins et al., U.S. Appl. No. 16/788,556, filed Feb. 12, 2020; 32 pages.

Cleary et al., U.S. Appl. No. 17/375,326, filed Jul. 14, 2021; 49 pages.

Extended European Search Report dated Oct. 13, 2022 for related European Appln. No. 22178237.8; 7 Pages.

* cited by examiner

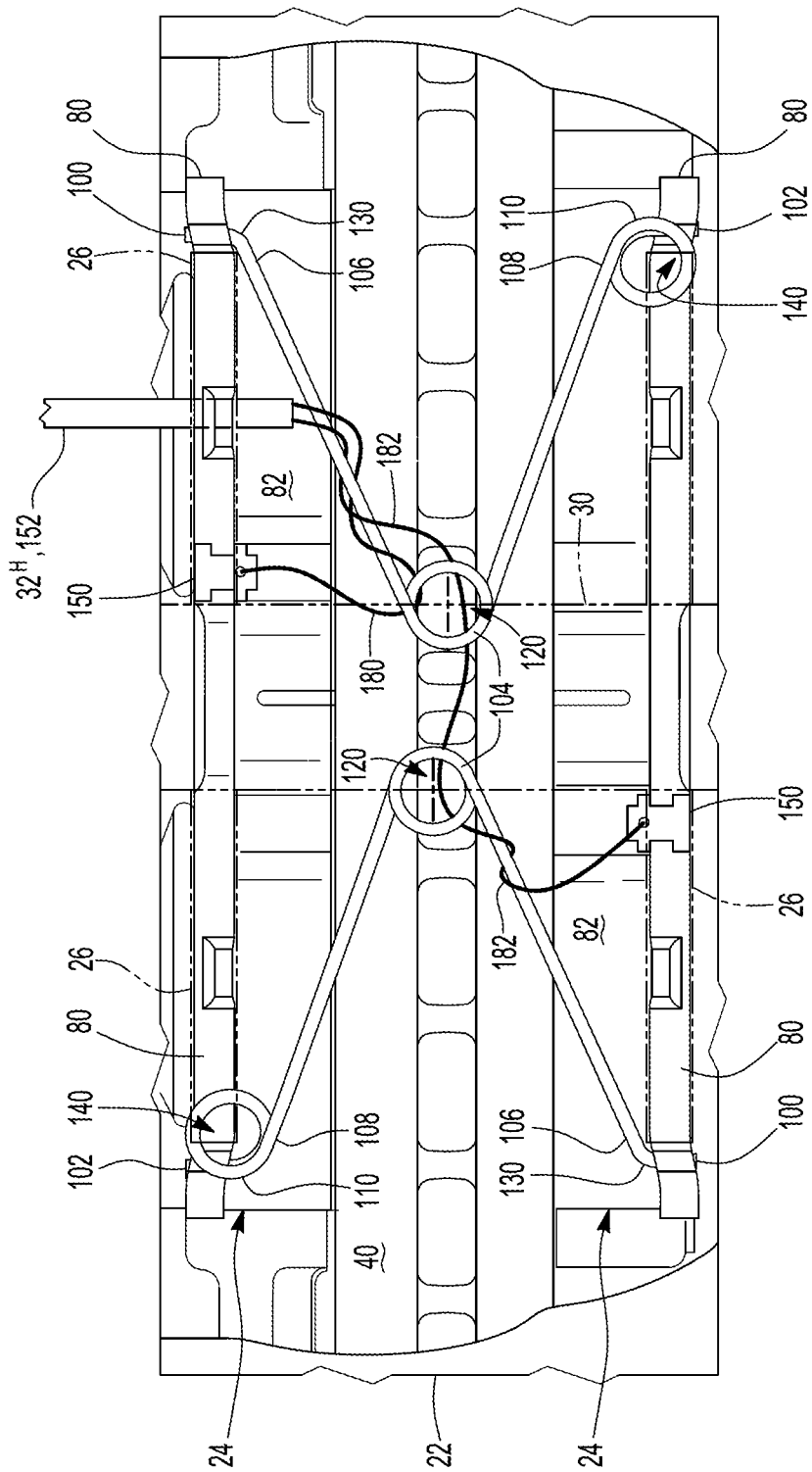

DISC BRAKE ASSEMBLY HAVING A SENSOR ASSEMBLY ATTACHED TO A RETRACTION SPRING

TECHNICAL FIELD

This relates to a disc brake assembly that has a sensor assembly that is attached to a brake pad retraction spring.

BACKGROUND

A disc brake having springs is disclosed in U.S. Pat. No. 4,491,204.

SUMMARY

In at least one embodiment a disc brake assembly is provided. The disc brake assembly includes a pair of brake pad assemblies, at least one brake pad retraction spring, and a sensor assembly. The brake pad retraction spring extends between the brake pad assemblies and biases the brake pad assemblies away from each other. The sensor assembly has at least one sensor and a wire harness. The sensor is disposed on a brake pad assembly. The wire harness is electrically connected to the sensor and is attached to the brake pad retraction spring.

BRIEF DESCRIPTION OF THE DRAWINGS

FIGS. 12-19 are magnified views of the portion of the brake assembly shown in FIG. 4 that illustrate additional sensor assembly configurations.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
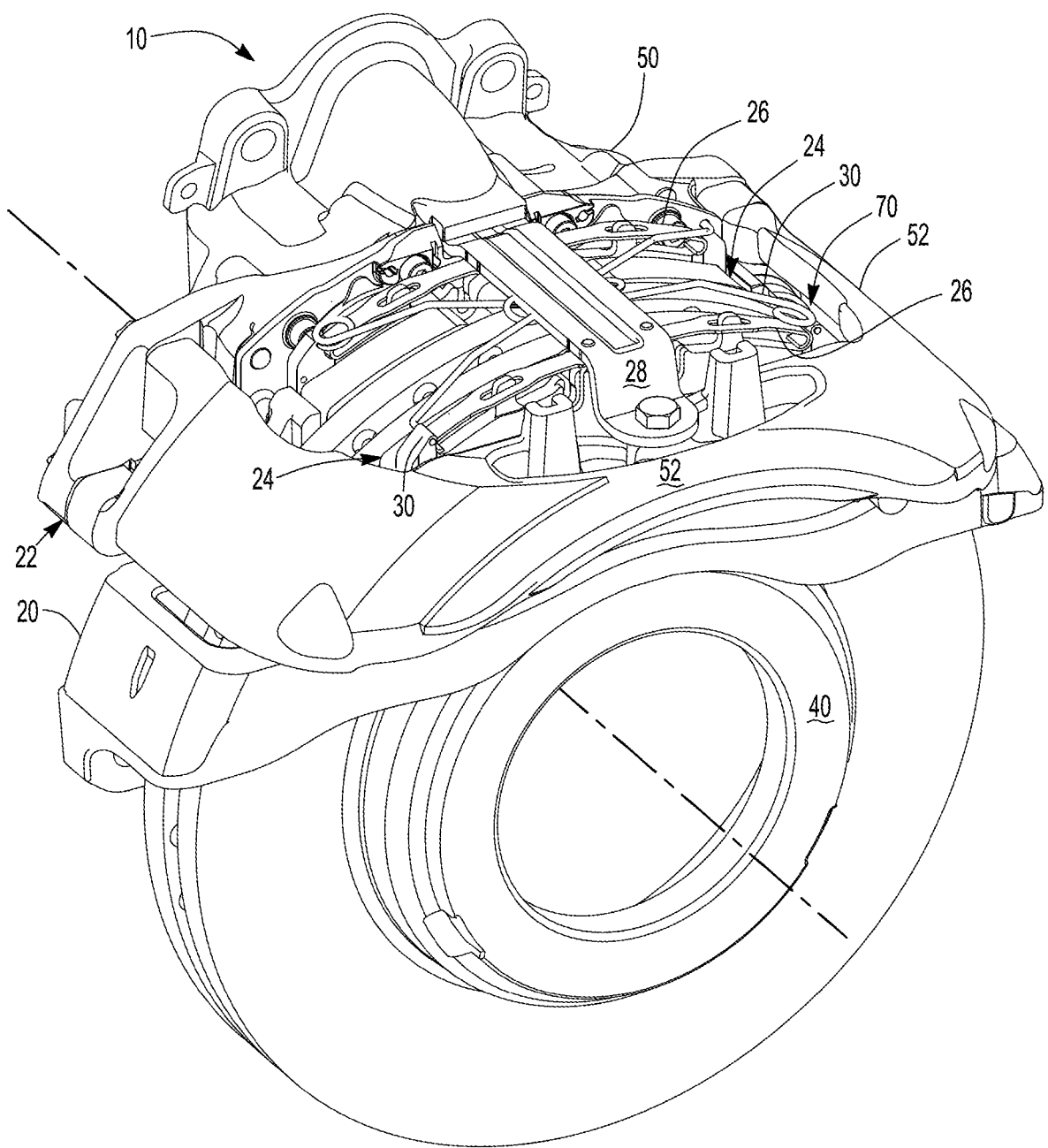
FIG. 1 is a perspective view of an example of a brake assembly with a sensor assembly omitted for clarity.
Figure 4:
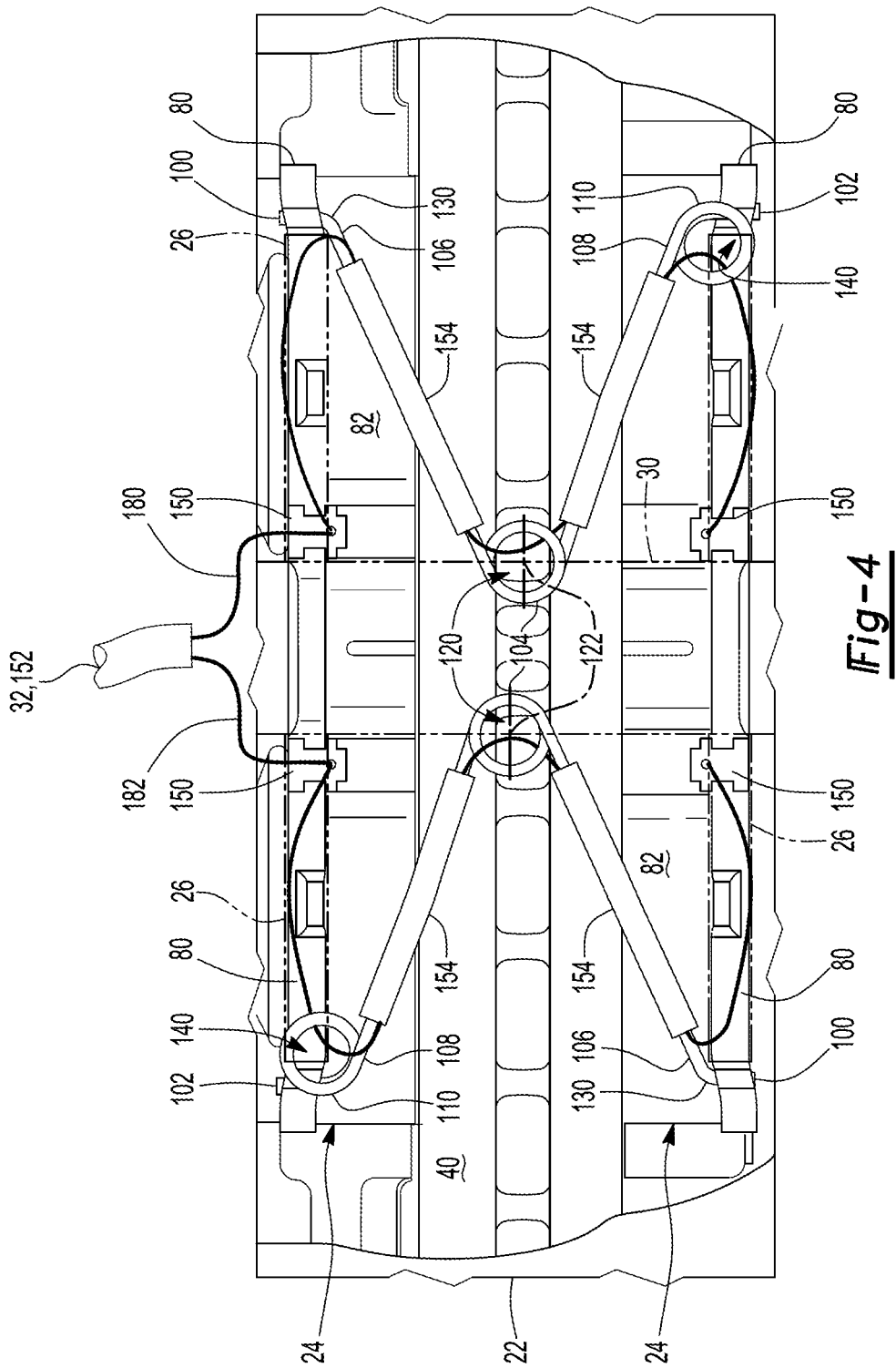
FIG. 4 is a magnified view of a portion of FIG. 3 that includes the sensor assembly and shows pad springs and a retainer strap in phantom for clarity.

Referring to FIG. 1, an example of a disc brake assembly 10 is shown. The disc brake assembly 10 may be provided as part of a vehicle, such as a truck, bus, farm equipment, military transport or weaponry vehicle, or cargo loading equipment for land, air, or marine vessels. In at least one configuration, the disc brake assembly 10 may include a brake carrier 20, a brake caliper 22, at least one brake pad assembly 24, one or more pad springs 26, a retainer strap 28, and one or more brake pad retraction springs 30. The disc brake assembly 10 may also include a sensor assembly 32 an example of which is best shown in FIG. 4.

The brake carrier 20 may facilitate mounting of the disc brake assembly 10. For instance, the brake carrier 20 may be fixedly mounted to a component of the vehicle, such as an axle assembly or a knuckle. The brake carrier 20 may receive and support the brake pad assemblies 24 and may include an opening through which a brake rotor 40 may extend. As such, the brake carrier 20 may straddle the brake rotor 40 and may help position brake pad assemblies 24 on opposite sides of the brake rotor 40.

The brake caliper 22 may be mounted to the brake carrier 20 and may support various components of the disc brake assembly 10. In addition, the brake caliper 22 may help position the brake pad assemblies 24 with respect to the brake rotor 40 to facilitate braking of the vehicle as will be discussed in more detail below. In at least one configuration, the brake caliper 22 may include a caliper housing 50 and a caliper bridge 52.

Figure 2:
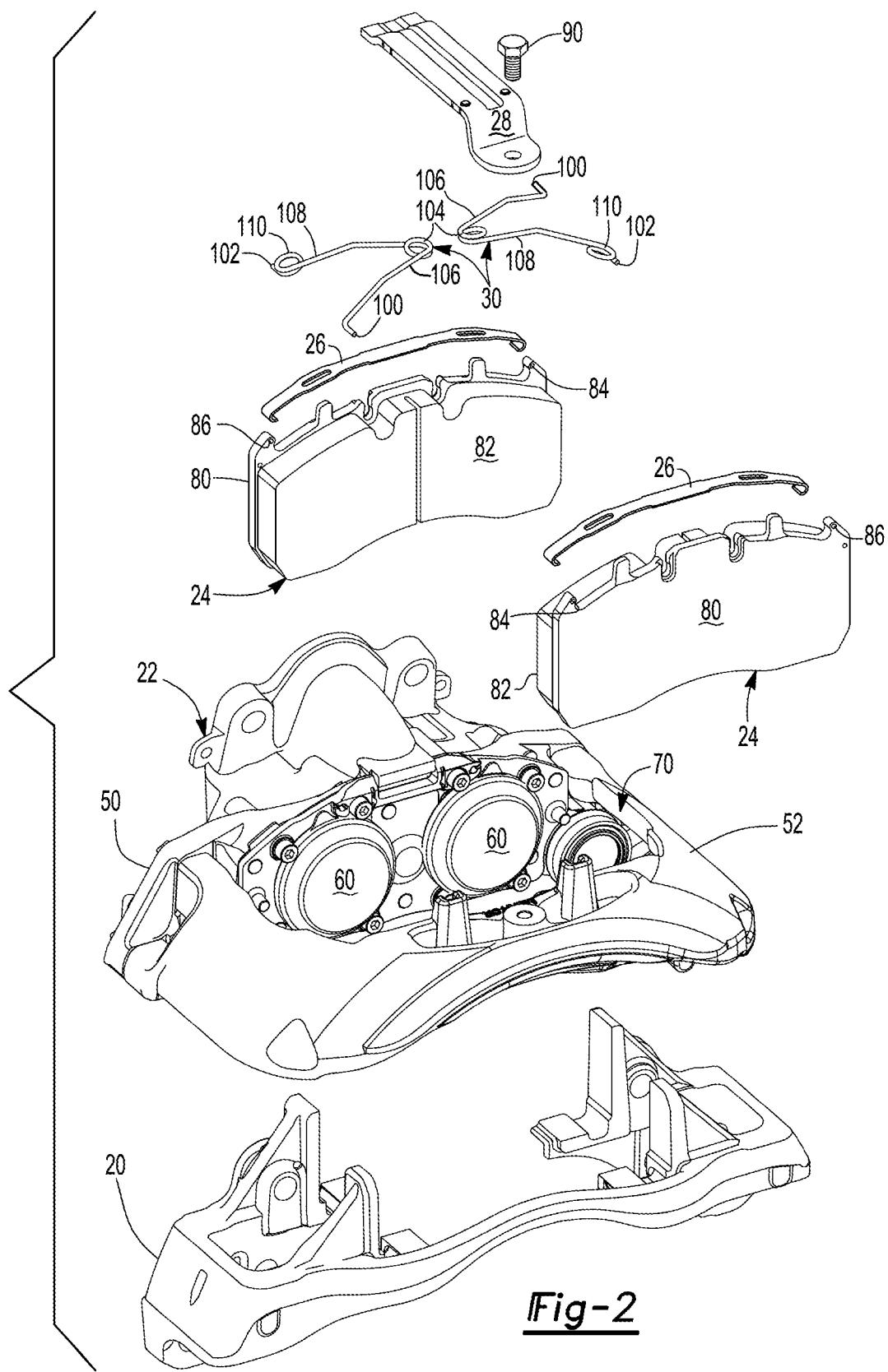
FIG. 2 is an exploded view of the brake assembly of FIG. 1.

Referring to FIGS. 1 and 2, the caliper housing 50 may be moveably disposed on the brake carrier 20. For example, the caliper housing 50 may be slidable along a pair of guide pins that may be fixedly disposed on the brake carrier 20. The caliper housing 50 may receive or support various components that may facilitate actuation of a brake pad assembly 24. For instance, the caliper housing 50 may support at least one tappet 60 that may protrude from an internal chamber of the caliper housing 50.

Referring to FIG. 2, a tappet 60 may extend from the caliper housing 50 toward the brake rotor 40 to engage a brake pad assembly 24. The tappet 60 may be moveable toward and away from the brake rotor 40. For instance, an actuator may extend the tappet 60 to actuate a brake pad assembly 24 that is disposed between the caliper housing 50 and the brake rotor 40 into engagement with the brake rotor 40. A reaction force may then move the caliper housing 50 and caliper bridge 52 with respect to the brake carrier 20 to actuate a brake pad assembly 24 that is disposed between the caliper bridge 52 and the brake rotor 40 into engagement with an opposite side of the brake rotor 40 to help slow rotation of the brake rotor 40 and an associated vehicle wheel.

The caliper bridge 52 may be fixedly positioned with respect to the caliper housing 50. The caliper bridge 52 may be integrally formed with the caliper housing 50 or may be a separate component that is mounted to the caliper housing 50. For example, the caliper bridge 52 may be coupled or secured to the caliper housing 50 with one or more fasteners, such as bolts. In at least one configuration, the caliper bridge 52 may cooperate with the caliper housing 50 to define a cavity 70.

The cavity 70 may at least partially receive the brake pad assemblies 24 and the brake rotor 40. The cavity 70 may be configured as a large through hole that may be encircled by the brake caliper 22. A portion of the brake carrier 20 may extend into the cavity 70 and may help position the brake pad assemblies 24. A brake pad assembly 24 may be inserted into the cavity 70 and installed on the brake carrier 20 or removed from the cavity 70 and the brake carrier 20 when the retainer strap 28 is removed.

Figure 3:
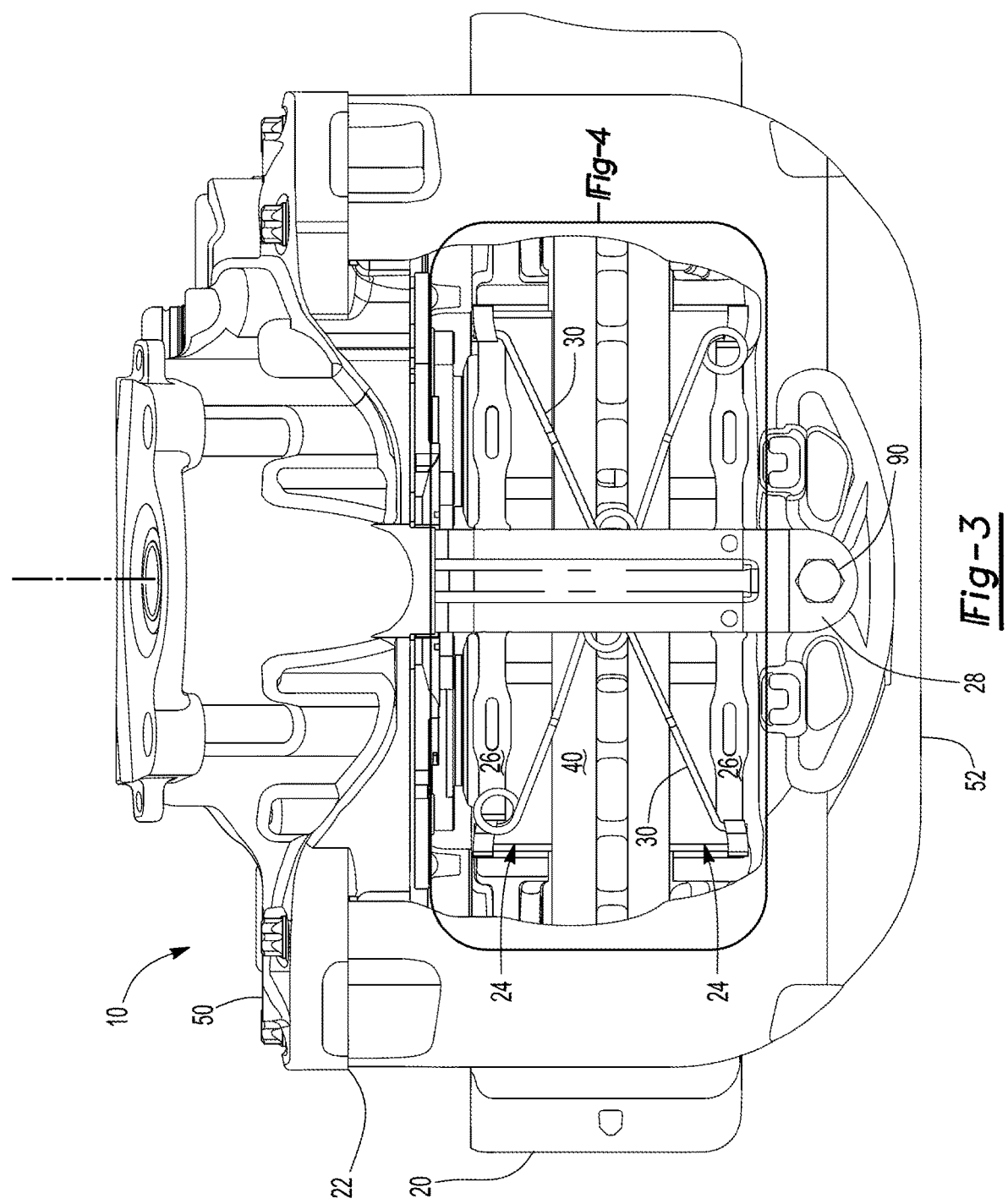
FIG. 3 is a top view of the brake assembly of FIG. 1.

Referring primarily to FIGS. 2 and 3, a pair of brake pad assemblies 24 may be received in the brake carrier 20 and the cavity 70. The brake pad assemblies 24 may be disposed on opposite sides of the brake rotor 40 and may have similar or identical configurations. For convenience in reference, the brake pad assembly 24 that is disposed between the brake rotor 40 and the tappet 60 may be referred to as an inboard brake pad assembly while the brake pad assembly 24 that is disposed between the brake rotor 40 and the caliper bridge 52 may be referred to as an outboard brake pad assembly. Also for convenience in reference, the brake pad assemblies 24 may be referred to as a "first brake pad assembly" and a "second brake pad assembly" below. The first and second brake pad assemblies may be the inboard and outboard brake pad assemblies, respectively, or vice versa. In at least one configuration, a brake pad assembly 24 may include a backplate 80 and friction material 82.

The backplate 80 may be a structural member of the brake pad assembly 24. The backplate 80 may be configured as a generally flat plate and may be made of any suitable material, such as a metal alloy. The tappet 60 may engage the backplate 80 of the inboard brake pad assembly 24. For instance, the tappet 60 may engage a side of the backplate 80 that may face away from the brake rotor 40 and that may be disposed opposite the friction material 82. The backplate 80 of the outboard brake pad assembly 24 may engage the caliper bridge 52. The backplate 80 may also include a first hole 84 and a second hole 86 that may facilitate mounting of a brake pad retraction spring 30. In at least one configuration, the first hole 84 and the second hole 86 may be disposed above the friction material 82.

The friction material 82 may be disposed on a side of the backplate 80 that may face toward the brake rotor 40. The friction material 82 may contact the brake rotor 40 during vehicle braking.

The pad spring 26, if provided, may be at least partially disposed in the cavity 70. The pad spring 26 may exert a biasing force against a component that is received in the cavity 70 such as a brake pad assembly 24 or the tappet 60. In the configuration shown, two pad springs 26 are illustrated; however, it is contemplated that a different number of pad springs 26 may be provided. The pad springs 26 may be spaced apart from each other and may extend from the retainer strap 28 into the cavity 70. For instance, one pad spring 26 may extend from the retainer strap 28 to the inboard brake pad assembly 24 and another pad spring 26 may extend from the retainer strap 28 to the outboard brake pad assembly 24.

The retainer strap 28 may extend across the brake pad assemblies 24 and the cavity 70 of the brake caliper 22 to help retain the brake pad assemblies 24 in the brake carrier 20 when the retainer strap 28 is secured to the brake caliper 22. The retainer strap 28 may be removably mountable to the brake caliper 22. For instance, a first end of the retainer strap 28 may be mounted to the caliper housing 50 while a second end of the retainer strap 28 that is disposed opposite the first end may be mounted to the caliper bridge 52. The second end may be secured to the caliper bridge 52 in any suitable manner, such as with a fastener 90 like a bolt. The retainer strap 28 may be removed from the brake caliper 22 to facilitate removal or replacement of a brake pad assembly 24 and may be installed on the brake caliper 22 to inhibit removal of a brake pad assembly 24. The retainer strap 28 may engage or contact a brake pad assembly 24, a pad spring 26, a brake pad retraction spring 30, or combinations thereof when the retainer strap 28 is installed and secured to the brake caliper 22.

Referring primarily to FIGS. 2 and 3, at least one brake pad retraction spring 30 may be provided with the disc brake assembly 10. A brake pad retraction spring 30 may facilitate retraction of the brake pad assemblies 24 away from the brake rotor 40 when braking force is not applied. As such, a brake pad retraction spring may bias the brake pad assemblies 24 away from the brake rotor 40 and away from each other. For instance, first and second brake pad retraction springs 30 may be provided that may extend in opposite lateral directions from the retainer strap 28, or to the left and right from the perspective shown in FIG. 3. The brake pad retraction spring 30 may extend between the inboard brake pad assembly 24 and the outboard brake pad assembly 24. For example, a brake pad retraction spring 30 may extend from the backplate 80 of the inboard brake pad assembly 24 to the backplate 80 of the outboard brake pad assembly 24.

The brake pad retraction spring 30 may be provided in various configurations. As an example and as is best shown with reference to FIGS. 2 and 4, the brake pad retraction spring 30 may include a first end 100, a second end 102, a coil 104, a first arm 106, a second arm 108, and optionally one or more anti-rotation features 110.

The first end 100 may be mounted to a brake pad assembly 24. For example, the first end 100 of the brake pad retraction spring 30 may be inserted into and may be received in the first hole 84 of the backplate 80 of a brake pad assembly 24. In at least one configuration, the first end 100 may not be coplanar with the coil 104, the first arm 106, the anti-rotation feature 110, or combinations thereof when the brake pad retraction spring 30 is installed or when the brake pad retraction spring 30 is not installed and is in a free state or uncompressed state.

The second end 102 may be disposed opposite the first end 100. The second end 102 may be mounted to the other brake pad assembly 24. For example, the second end 102 of the brake pad retraction spring 30 may be inserted into and may be received in the second hole 86 of the backplate 80 of another brake pad assembly 24. In at least one configuration, the first end 100 may not be coplanar with the coil 104, the second arm 108, the anti-rotation feature 110, or combinations thereof when the brake pad retraction spring 30 is installed or when the brake pad retraction spring 30 is not installed and is in a free state or uncompressed state.

In configurations that have two brake pad retraction springs 30, the first and second ends 100, 102 of one brake pad retraction spring 30 may be mounted to first and second brake pad assemblies 24, 24, respectively, while the first and second ends 100, 102 of the other brake pad retraction spring 30 may be mounted to the second and first brake pad assemblies 24, 24, respectively.

The coil 104 may be disposed between the first end 100 and the second end 102. The coil 104 may engage the retainer strap 28. For instance, the coil 104 may contact a side of the retainer strap 28 that may face toward the brake rotor 40 and the cavity 70. As such, the retainer strap 28 may inhibit movement of the coil 104 away from the brake rotor 40 or rotation of the brake pad retraction spring 30 away from the brake rotor 40. As is best shown in FIG. 4, the coil 104 may define a coil hole 120 that may extend around and may encircle an axis 122. The coil hole 120 and the axis 122 may be encircled by one or more turns or spirals that make up the coil 104. For instance, as is best shown with reference to FIGS. 9-11, the coil 104 may include a first coil portion 124 and a second coil portion 126 that may at least partially define the coil hole 120 and that may be contiguous with each other. The first coil portion 124 and the second coil portion 126 may be stacked or arranged along the axis 122 such that the first coil portion 124 may be disposed above the second coil portion 126.

Referring to FIG. 4, the first arm 106 may extend from the coil 104 toward the first end 100. In at least one configuration, the first arm 106 may include an arm bend 130 that may be disposed between and may be spaced apart from the coil 104 and the first end 100. In the configuration shown, the first arm 106 is provided without an anti-rotation feature 110; however, it is contemplated that an anti-rotation feature may also be provided with the first arm 106.

The second arm 108 may be spaced apart from the first arm 106. The second arm 108 may extend from the coil 104 toward the second end 102. The second arm 108 may have the same configuration or a different configuration than the first arm 106. In the configuration shown, an anti-rotation feature 110 is provided with the second arm 108.

One or more anti-rotation features 110 may optionally be provided with the brake pad retraction spring 30. The anti-rotation feature 110 may be disposed between the coil 104 and the first end 100, between the coil 104 and the second end 102, or both. The anti-rotation feature 110 may engage a brake pad assembly 24, a pad spring 26, or both to inhibit rotation of the brake pad retraction spring 30 toward the brake rotor 40, thereby preventing the brake pad retraction spring 30 from contacting the brake rotor 40. For example, an anti-rotation feature 110 may be disposed above at least a portion of a corresponding brake pad assembly 24 and may contact the corresponding brake pad assembly 24 to inhibit rotation of the coil 104 away from the retainer strap 28 and toward the brake rotor 40. In the configurations shown in FIGS. 2-4 and 12-19, the anti-rotation feature 110 is depicted as being a coil. In such a configuration, the coil of the anti-rotation feature 110 may define a hole 140 that may be encircled by one or more turns or spirals that make up the coil. The anti-rotation feature 110 may be disposed between the pad spring 26 and the backplate 80. Alternatively, the pad spring 26 or a portion thereof may be disposed between the backplate 80 and the anti-rotation feature 110.

Referring to FIG. 4, an example of a sensor assembly 32 shown. The sensor assembly 32 may be configured to detect and communicate a condition or attribute of the disc brake assembly 10. The sensor assembly 32 may include one or more sensors 150 and a wire harness 152. In addition, one or more attachment features 154 may be associated with the sensor assembly 32.

A sensor 150 may be configured to provide a signal indicative of one or more attributes associated with the disc brake assembly 10. As an example, the sensor 150 may detect or provide a signal indicative of wear of the friction material 82. In the configuration shown in FIG. 4, four sensors 150 are shown; however, it is contemplated that a different number of sensors may be provided. The sensor 150 may be located in any suitable location. In the configuration shown, each sensor 150 is disposed on the backplate 80 of a brake pad assembly 24 and protrudes from the backplate 80 toward the brake rotor 40. Upon sufficient wear of the friction material 82, the sensor 150 may contact the brake rotor 40 during braking and provide a signal that may be indicative of wear of the friction material 82 and that the brake pad assembly 24 should be replaced. It is contemplated that the signal may be generated by the sensor 150 or may be associated with opening or closing an electrical circuit. For instance, the engagement of the brake rotor 40 with the sensor 150 may sever or otherwise disconnect a normally continuous electrical circuit, resulting in a change to one or more electrical attributes, such as current or voltage, which may be detected or identified by an electronic controller that may receive the signal in a manner known by those skilled in the art.

The wire harness 152 may be electrically connected to the sensor 150. The wire harness 152 may include one or more conductors or wires that may extend from one or more sensors 150.

As an overview, a wire harness may be provided with sufficient length to move with a brake pad assembly when braking is applied and released. As a result, the wire harness may flex, bend, or otherwise move during braking. The wire harness may also move in response to vibrations that may be transmitted to the disc brake assembly when the vehicle is in motion. A wire harness may be susceptible to damage during operation of the disc brake assembly if improperly configured. For instance, the wire harness may be damaged if it moves into contact with the brake rotor or becomes pinched between a brake pad assembly and the brake rotor. Potential damage to the wire harness may be avoided by attaching the wire harness to one or more brake pad retraction springs.

The wire harness 152 may be attached to a brake pad retraction spring 30 with one or more attachment features 154, may be directly attached to a brake pad retraction spring 30, or combinations thereof. An attachment feature 154 may be separate from the brake pad retraction spring 30 and the wire harness 152. Direct attachment may utilize the brake pad retraction spring 30 or the wire harness 152 itself to facilitate attachment. Both types of attachment techniques will now be discussed.

Referring to FIG. 4, an attachment feature 154 may attach the wire harness 152 to a brake pad retraction spring 30 in a manner that permits limited movement of the wire harness 152 with respect to the brake pad retraction spring 30 and/or the attachment feature 154 or that prevents movement of the attached portion of the wire harness 152 with respect to the brake pad retraction spring 30 and/or the attachment feature 154. An attachment feature 154 may have any suitable configuration. Referring to FIGS. 5-8, some examples of attachment features 154 are shown.

Figure 5:
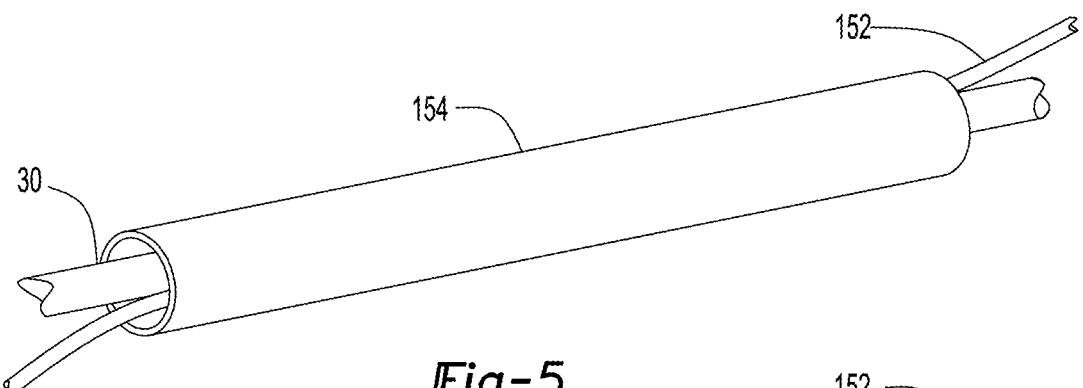
FIGS. 5-8 illustrate examples of attachment features for attaching a wire harness of the sensor assembly to a brake pad retraction spring.

In FIG. 5, an attachment feature 154 is shown that may be configured as a tubular structure that may partially or completely encircle the wire harness 152, the brake pad retraction spring 30, or both. The attachment feature 154 may be tape that may have an adhesive backing, tubing that may or may not be split, a clip, tie, strap, hook and loop fastener, or the like. It is also contemplated that the attachment feature may be an adhesive and may not completely encircle the wire harness 152, the brake pad retraction spring 30, or both.

Figure 6:
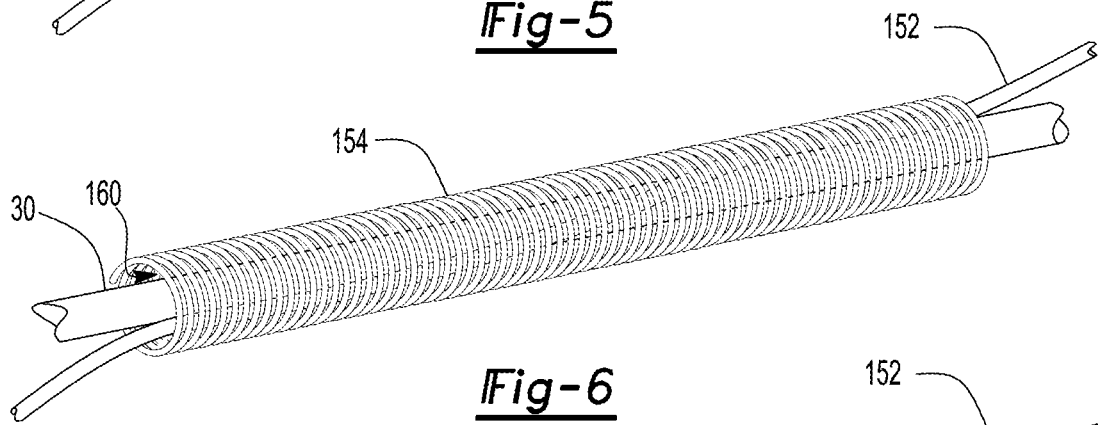

In FIG. 6, the attachment feature 154 is configured as a coil spring. The coil spring may define a coil spring passage 160 through which the brake pad retraction spring 30 and the wire harness 152 may extend. For instance, the coil spring may extend in a spiral around the brake pad retraction spring 30 and the wire harness 152 and thus may define the coil spring passage 160 within the spiral.

Figure 7:
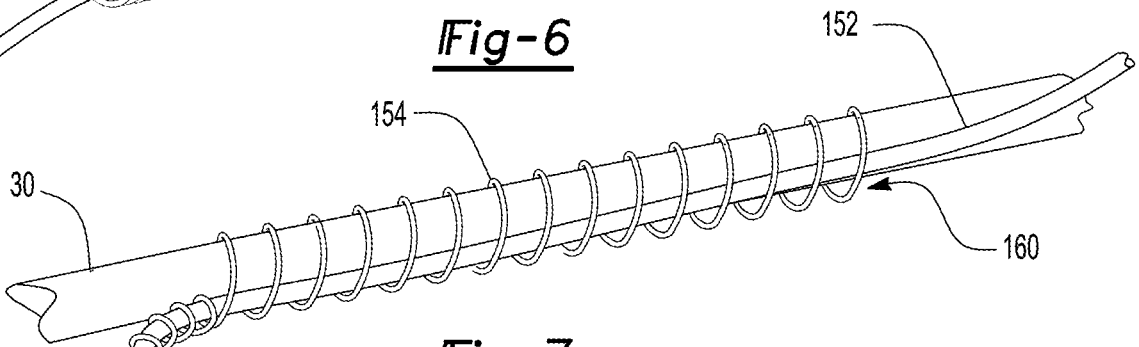

In FIG. 7, the attachment feature 154 is again configured as a coil spring that defines a coil spring passage 160. The brake pad retraction spring 30 and the wire harness 152 may extend together through a portion of the coil spring passage 160 to help retain the wire harness 152 upon the brake pad retraction spring 30. However, a portion of the coil spring and the coil spring passage 160 may receive the wire harness 152 but not the brake pad retraction spring 30, thereby exerting a biasing force on the wire harness 152. As a result, the coil spring and portion of the coil spring passage 160 that receives the wire harness 152 but not the brake pad retraction spring 30 may help control movement of the portion of the wire harness 152 that is received in the coil spring passage 160 by itself by exserting a biasing force on the wire harness 152, such as may occur when the coil spring attempt to move to a straightened condition. As such, the coil spring may help route the wire harness 152 away from the brake rotor 40 or a location where the wire harness 152 may be pinched between moveable components of the disc brake assembly 10. The coils of attachment feature 154 and the coil spring passage 160 may be a constant size or may have different sizes. For instance, the coil spring passage 160 may be larger in a region that receives the wire harness 152 and the brake pad retraction spring 30 as compared to a region that receives only one of these components.

Figure 8:
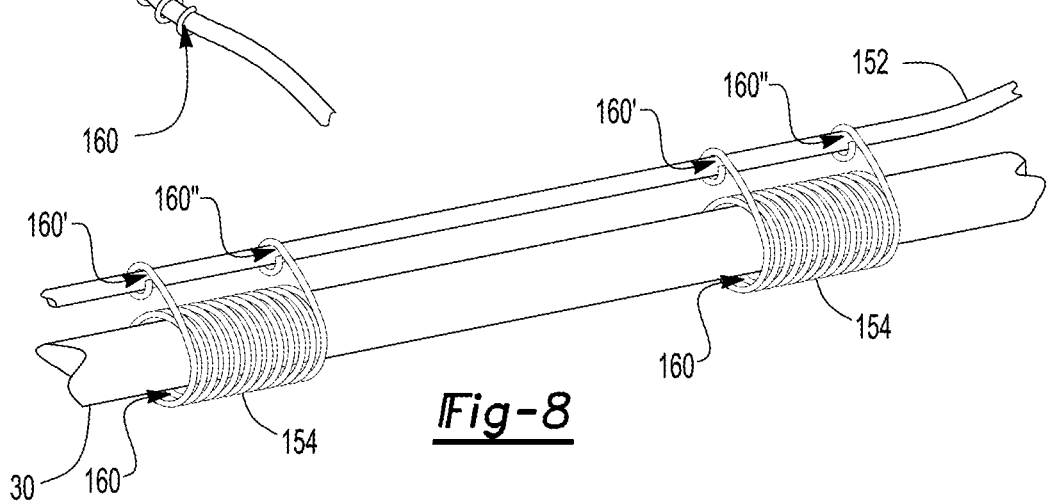

In FIG. 8, two attachment features 154 are shown that are configured as coil springs. The coil spring may define two or more coil spring passages. At least one coil spring passage may receive the brake pad retraction spring 30 but not the wire harness 152 while another coil spring passage may receive the wire harness 152 but not the brake pad retraction spring 30. In the configuration shown, the coil spring may define a first coil spring passage 160, a second coil spring passage 160', and optionally a third coil spring passage 160". The brake pad retraction spring 30 may extend through the first coil spring passage 160. The wire harness 152 may extend through the second coil spring passage 160' and the third coil spring passage 160".

The second coil spring passage 160' may be defined by coils of the coil spring that may be offset from the coils that define the first coil spring passage 160. As such, the second coil spring passage 160' may be disposed along a different coil spring axis than the first coil spring passage 160. In at least one configuration, the second coil spring passage 160' may extend from a first end of the coil spring.

The third coil spring passage 160" may be defined by coils of the coil spring that may be offset from the coils that define the first coil spring passage 160. As such, the third coil spring passage 160" may be disposed along a different coil spring axis than the first coil spring passage 160. In at least one configuration, the third coil spring passage 160" may extend from a second end of the coil spring that may be disposed opposite the first end.

Attachment features 154 are represented generically in FIGS. 4 and 12-19. It is to be understood that the generic representation of an attachment feature may represent any of the attachment features discussed herein. It is also to be understood that the generic representation of an attachment feature may represent a single attachment feature or multiple attachment features.

Referring to FIGS. 9, 10, 18, and 19 some examples of directly attaching the wire harness 152 to a brake pad retraction spring 30 are shown. Direct attachment may occur without utilizing an attachment feature that is separate from the brake pad retraction spring 30 and the wire harness 152. For instance, the brake pad retraction spring 30, the wire harness 152, or both may be configured to limit movement or prevent movement of the wire harness 152 with respect to the brake pad retraction spring 30 without a separate attachment feature.

Figure 9:
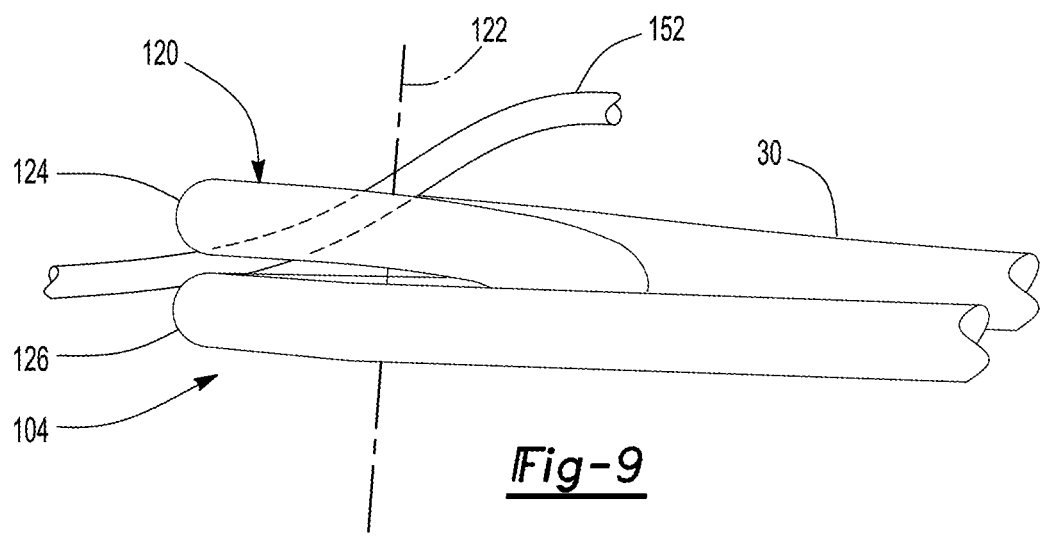
FIGS. 9 and 10 illustrates an example of a wire harness pinched by a coil of a brake pad retraction spring.
Figure 10:
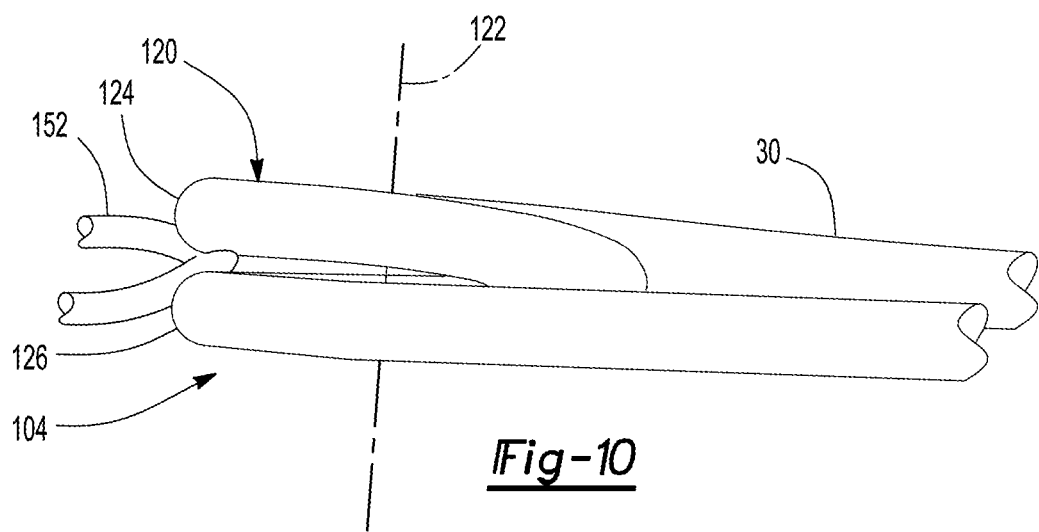

In FIGS. 9 and 10, the coil 104 may be configured to engage and pinch the wire harness 152. For instance, the wire harness 152 may extend between the first coil portion 124 and the second coil portion 126.

In FIG. 9, the wire harness 152 may pass through the coil hole 120 through the opening defined by the first coil portion 124 (e.g., from above the coil 104 from the perspective shown) or alternatively pass through the opening defined by the second coil portion 126 (e.g., from below the coil 104 from the perspective shown).

In FIG. 10, the wire harness 152 may pass between the first coil portion 124 and the second coil portion 126 without entering the coil hole 120 through the openings defined by the first coil portion 124 and the second coil portion 126.

It is also contemplated that the coil shown in FIGS. 9 and 10 may be the coil of an anti-rotation feature 110 rather than the coil 104 from which the first arm 106 and the second arm 108 of the brake pad retraction spring 30 extend.

Figure 18:
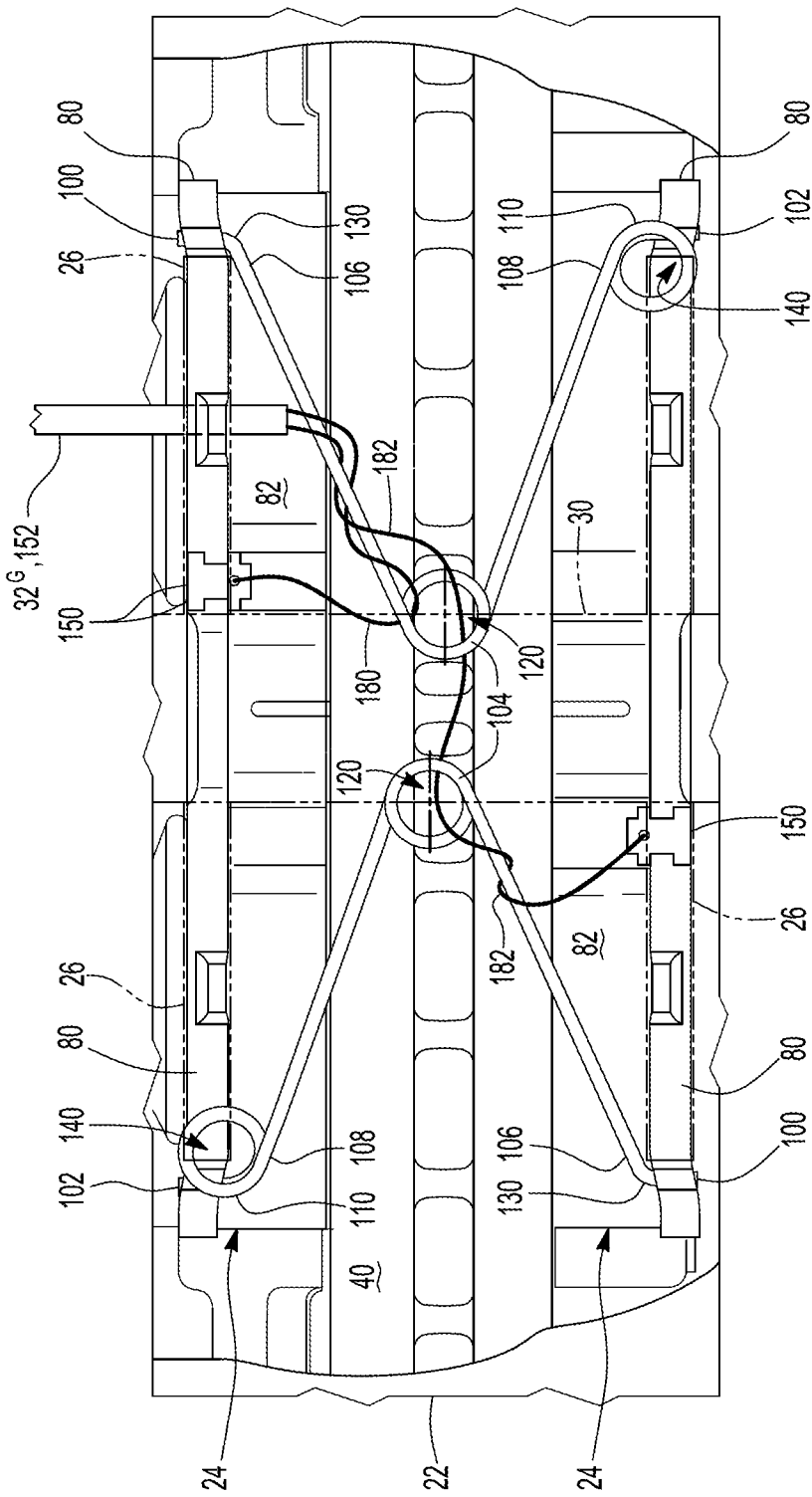

In FIGS. 18 and 19, the wire harness 152 may be twisted around, looped through, or tied to the brake pad retraction spring 30 to limit movement of the wire harness 152 with respect to the brake pad retraction spring 30. It is also contemplated that the wire harness 152 may be twisted around, looped through, or tied to itself. As such, the wire harness 152 may attach itself to the brake pad retraction spring 30.

Figure 11:
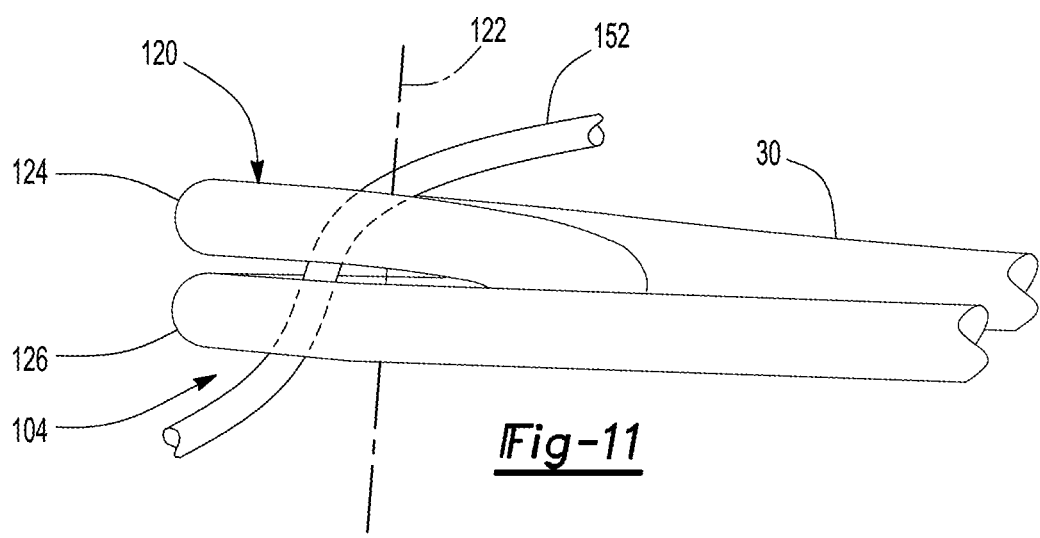
FIG. 11 illustrates an example of a wire harness passing through a coil hole of a brake pad retraction spring.

Referring to FIG. 11, an example of limiting movement of the wire harness 152 by passing the wire harness 152 through the coil hole 120 is shown. The size of the coil hole 120 may dictate the degree by which movement of the wire harness 152 is restricted. For instance, a smaller diameter coil hole 120 may limit movement by a greater degree than a larger diameter hole due to the reduced area provided by a smaller diameter hole. In FIG. 11, the wire harness 152 is not pinched by the coil 104. It is also contemplated that the coil 104 shown in FIG. 11 may be a coil that is provided with an anti-rotation feature 110. In such a configuration, the wire harness 152 may pass through the hole 140 of an anti-rotation feature 110.

Referring to FIGS. 4 and 12-19, examples of routing and attaching the wire harness 152 to one or more brake pad retraction springs 30 will now be discussed. It is to be understood that the wire harness 152 may be attached to a brake pad retraction spring 30 with one or more attachment features 154, which may be configured as previously discussed. Moreover, the wire harness 152 may be directly attached to a brake pad retraction spring 30 using any of the direct attachment configurations previously discussed. The direct attachment techniques may be substitutes for each other in the configurations discussed below.

In FIGS. 4 and 12-19, the pad springs 26 and the retainer strap 28 are simplified and shown in phantom to more clearly depict the sensor assembly 32. In FIGS. 12-19, the sensor assembly is designated with the number 32 along with a superscript letter for convenience in reference. A brake pad retraction spring 30 and the sensor assembly 32 may be positioned below the pad spring 26, the retainer strap 28, or both in these examples.

Referring to FIG. 4, the wire harness 152 may be routed from the inboard side of the disc brake assembly 10 to one or more sensors 150. The wire harness 152 may then be routed laterally along the top of a brake pad assembly 24 in a direction that may extend away from the retainer strap 28 and toward an end of a brake pad retraction spring 30. The wire harness 152 may then be routed along an arm of the brake pad retraction spring 30. For example, a portion of the wire harness 152 may be routed along the second arm 108 of the brake pad retraction spring 30 that is located to the left of the retainer strap 28 from the perspective shown while a portion of the wire harness 152 may be routed along the first arm 106 of the brake pad retraction spring 30 that is located to the right of the retainer strap 28. One or more attachment features 154 may attach or secure the wire harness 152 to a corresponding arm. The wire harness 152 may then pass through the coil hole 120 of the coil 104 and may extend to the other arm of the brake pad retraction spring 30. For instance, a portion of the wire harness 152 may be routed along the first arm 106 of the brake pad retraction spring 30 that is located to the left of the retainer strap 28 while a portion of the wire harness 152 may be routed along the second arm 108 of the brake pad retraction spring 30 that is located to the right of the retainer strap 28 from the perspective shown. The same attachment feature 154 or another attachment feature 154 may attach or secure the wire harness 152 to that arm. The wire harness 152 may then be routed along the top of another brake pad assembly 24 to another sensor 150. The wire harness 152 may also pass through the hole 140 of an anti-rotation feature 110 if an anti-rotation feature 110 is provided with a brake pad retraction spring 30.

Figure 12:
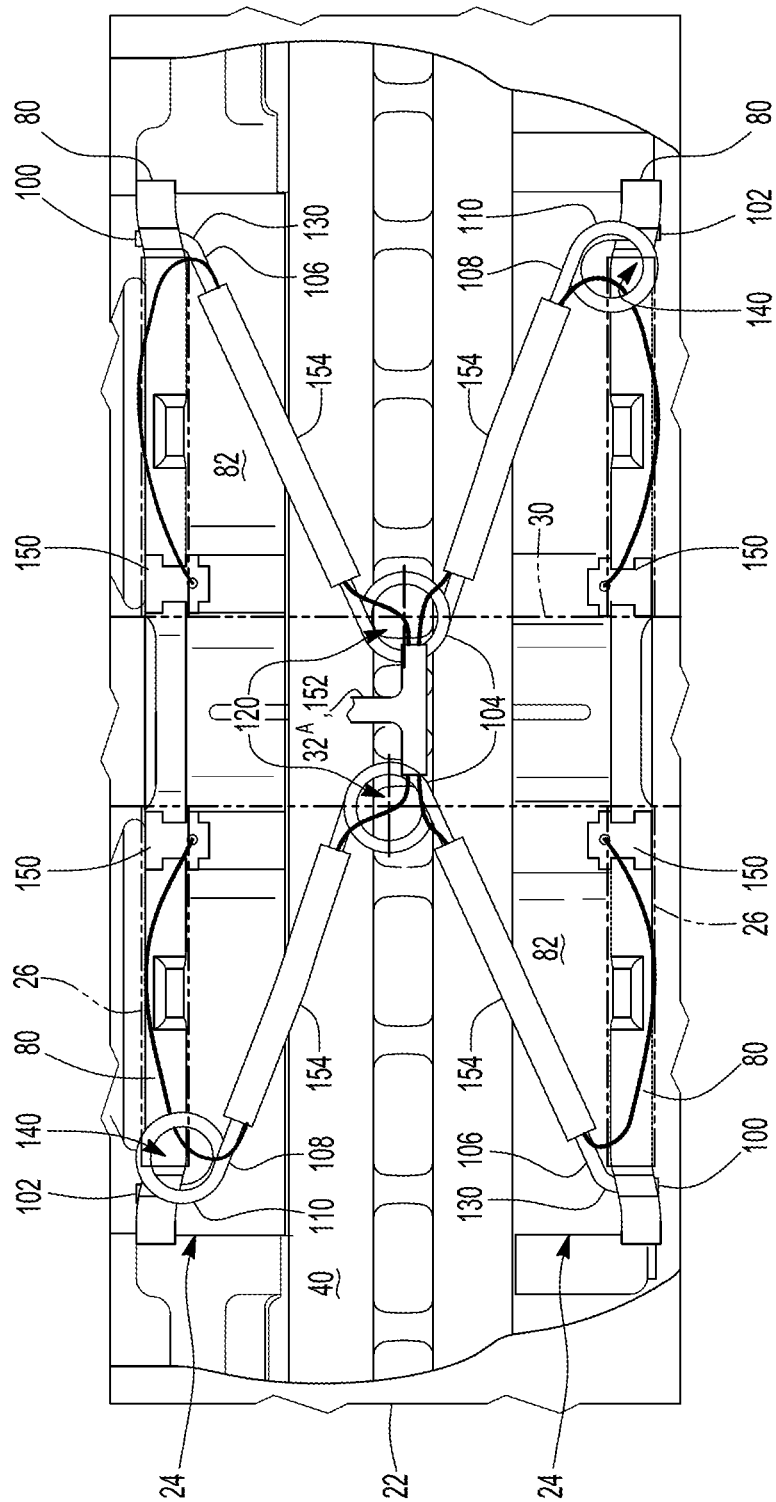

Referring to FIG. 12, a configuration of a sensor assembly $32^A$ is shown that is the similar to that shown in FIG. 4. In this configuration, the wire harness 152 may originate or start proximate the retainer strap 28. For instance, the wire harness 152 may branch apart from a location that is located over the brake rotor 40 and/or the retainer strap 28. Originating or starting the wire harness branches between the brake pad assemblies 24 or over the brake rotor 40 may allow branches of the wire harness 152 to travel or move approximately equal distances. As a result, at least one wire harness branch may be provided with a shorter length as compared to a wire harness that does not originate or start over the brake rotor 40. For instance, the configuration in FIG. 4 employs longer wire harness branches that are routed from an inboard sensor 150 (disposed closest to the top of FIG. 4 from the perspective shown) to an outboard sensor 150 (disposed closest to the bottom of FIG. 4 from the perspective shown). The increased length of these wire harness branches provides additional opportunities for the wire harness 152 to be pinched or potentially misrouted. In addition, the wire harness branch that is routed to the outboard sensor 150 must have a greater length to accommodate not only its routing path but also movement of the brake pad retraction spring 30 but also the movement of the caliper bridge 52 and the outboard brake pad assembly 24 with respect to the caliper housing 50 when braking is applied or released. In the configuration in FIG. 12, the wire harness 152 may or may not pass through the coils 104 and may or may not be pinched by the coils 104.

Figure 13:
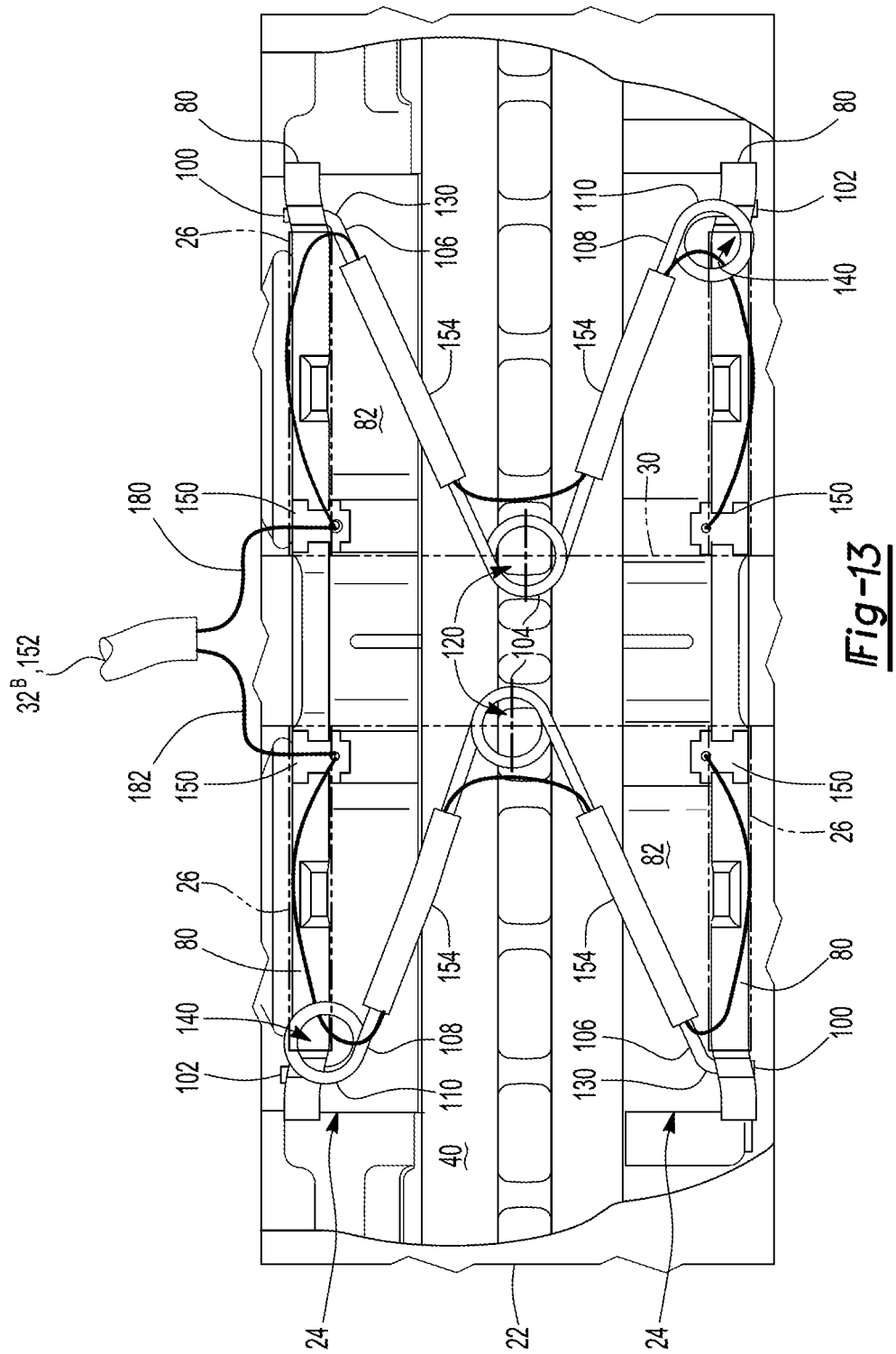

Referring to FIG. 13, a configuration of a sensor assembly $32^B$ is shown that is the same as that shown in FIG. 4 except that the wire harness 152 does not pass through the coils 104. Instead, the wire harness 152 bypasses the coils 104 and extends along an arc from one arm of the brake pad retraction spring 30 to another arm of the brake pad retraction spring 30.

Figure 14:
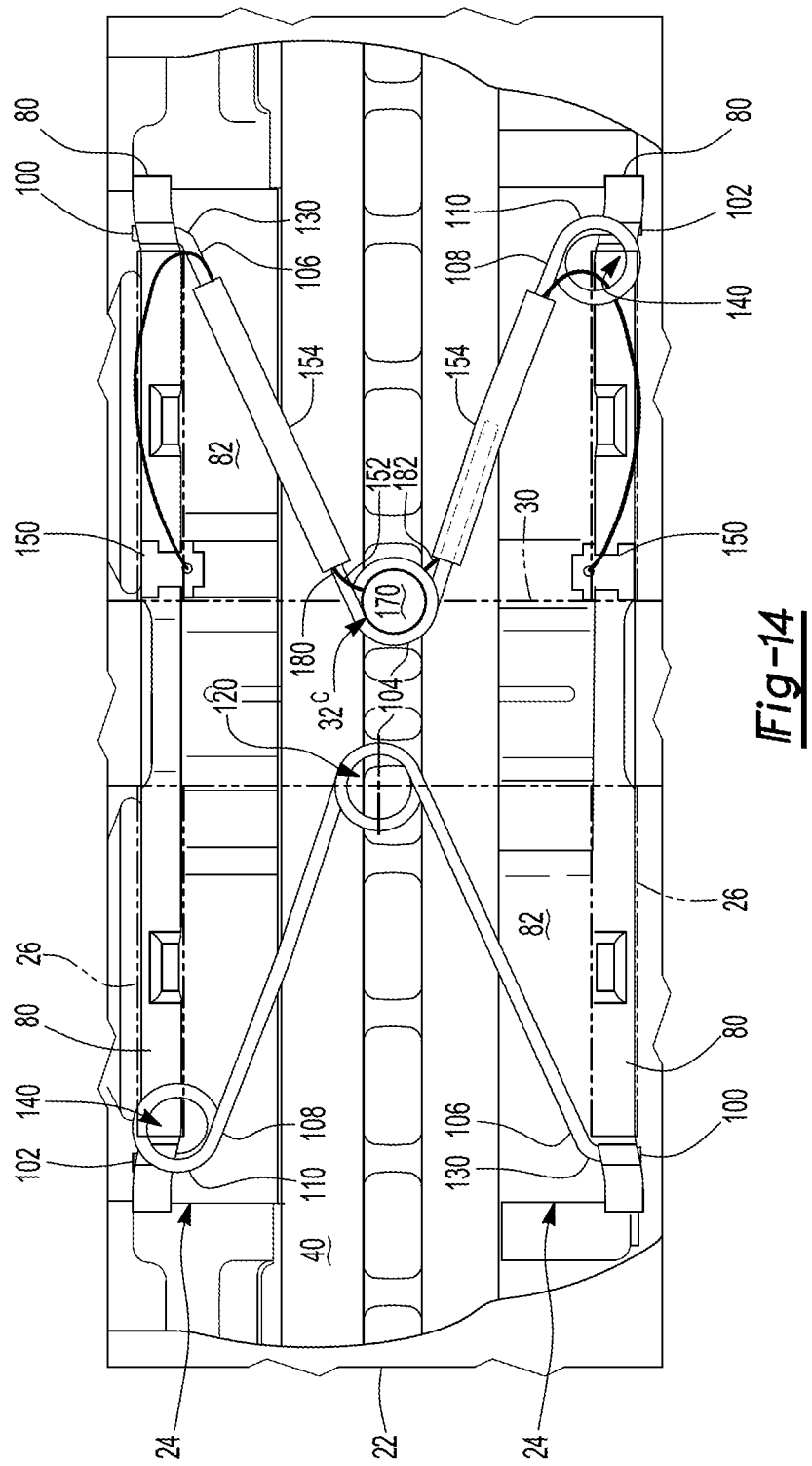

Referring to FIG. 14, a configuration of a sensor assembly $32^C$ is shown that is similar to that shown in FIG. 12. In this configuration, the sensor assembly $32^C$ includes a wireless transmitter 170. One or more branches 180, 182 of the wire harness 152 may extend from the wireless transmitter 170 to one or more sensors 150. The wireless transmitter 170 may wirelessly transmit to or communicate with a controller or control system that may be provided with the vehicle in a manner known by those skilled in the art. For instance, the wireless transmitter 170 may operate using similar communication principles as that associated with a wireless tire pressure sensor. The wireless transmitter 170 may be disposed in any suitable location. For instance, wireless transmitter may be disposed on the retainer strap 28 or the brake pad retraction spring 30. For example, the wireless transmitter 170 may be disposed on the coil 104 of a brake pad retraction spring 30. It is also contemplated that a wireless transmitter 170 may be provided with the other sensor assembly configurations and wire harness routings described herein.

In FIGS. 4, 12, and 13, it is contemplated that multiple sensors and associated branches of the wire harness 152 may be deleted. For instance, the sensors 150 to the left of the retainer strap 28 and portions of the wire harness 152 that extend from these sensor 150 may be deleted or the sensors 150 to the right of the retainer strap 28 and portions of the wire harness 152 that extend from these sensor 150 may be deleted. In such configurations, the wire harness 152 may be attached to a single brake pad retraction spring 30.

Figure 15:
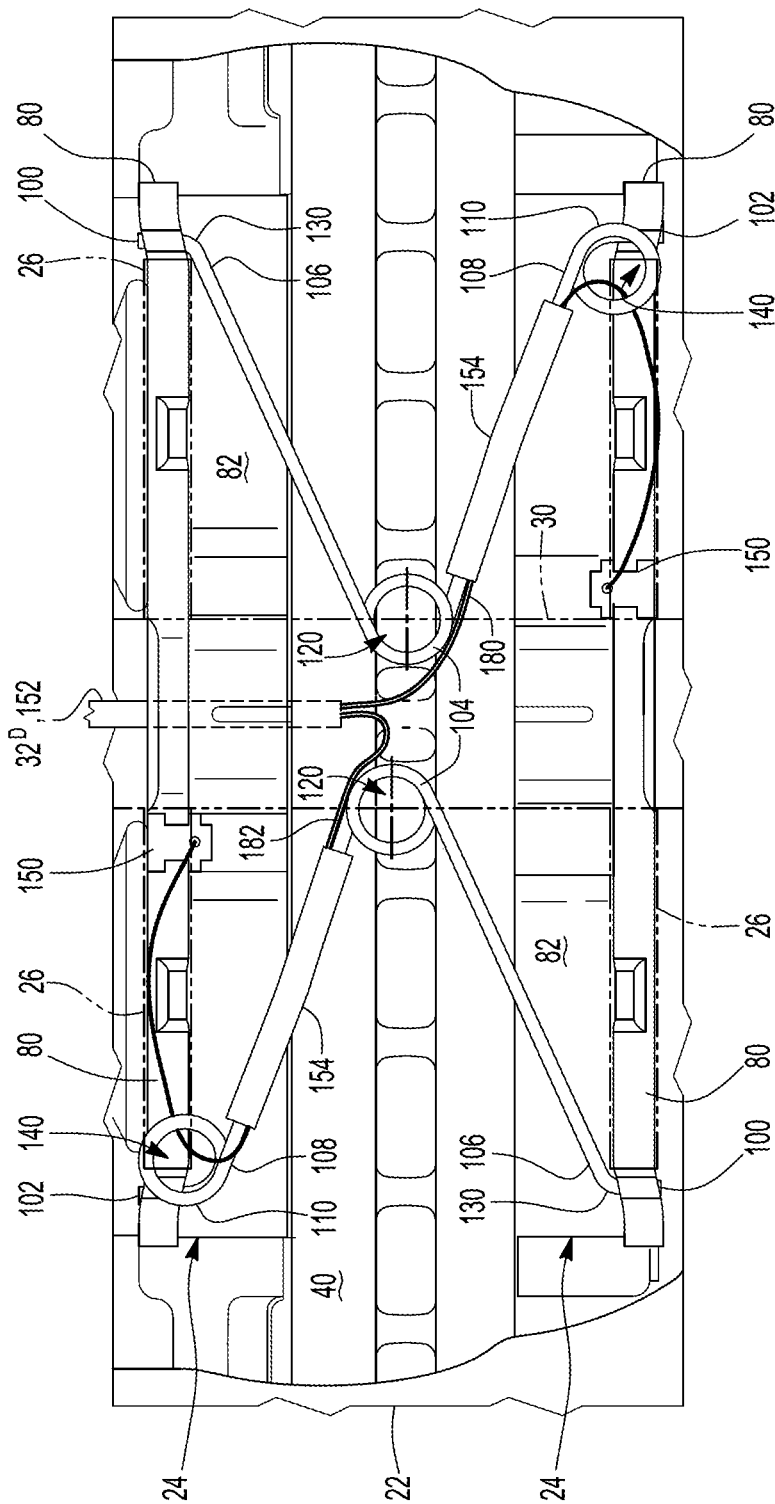

Referring to FIG. 15, a configuration of a sensor assembly $32^D$ is shown in which the wire harness 152 is attached to multiple brake pad retraction springs 30. For instance, the wire harness 152 may have a first branch 180 that may be attached to a first brake pad retraction spring 30 and a second branch 182 that may be attached to a second brake pad retraction spring 30. A branch may be attached to an arm of a corresponding brake pad retraction spring 30 with an attachment feature 154 as shown or may be directly attached as previously discussed.

Figure 16:
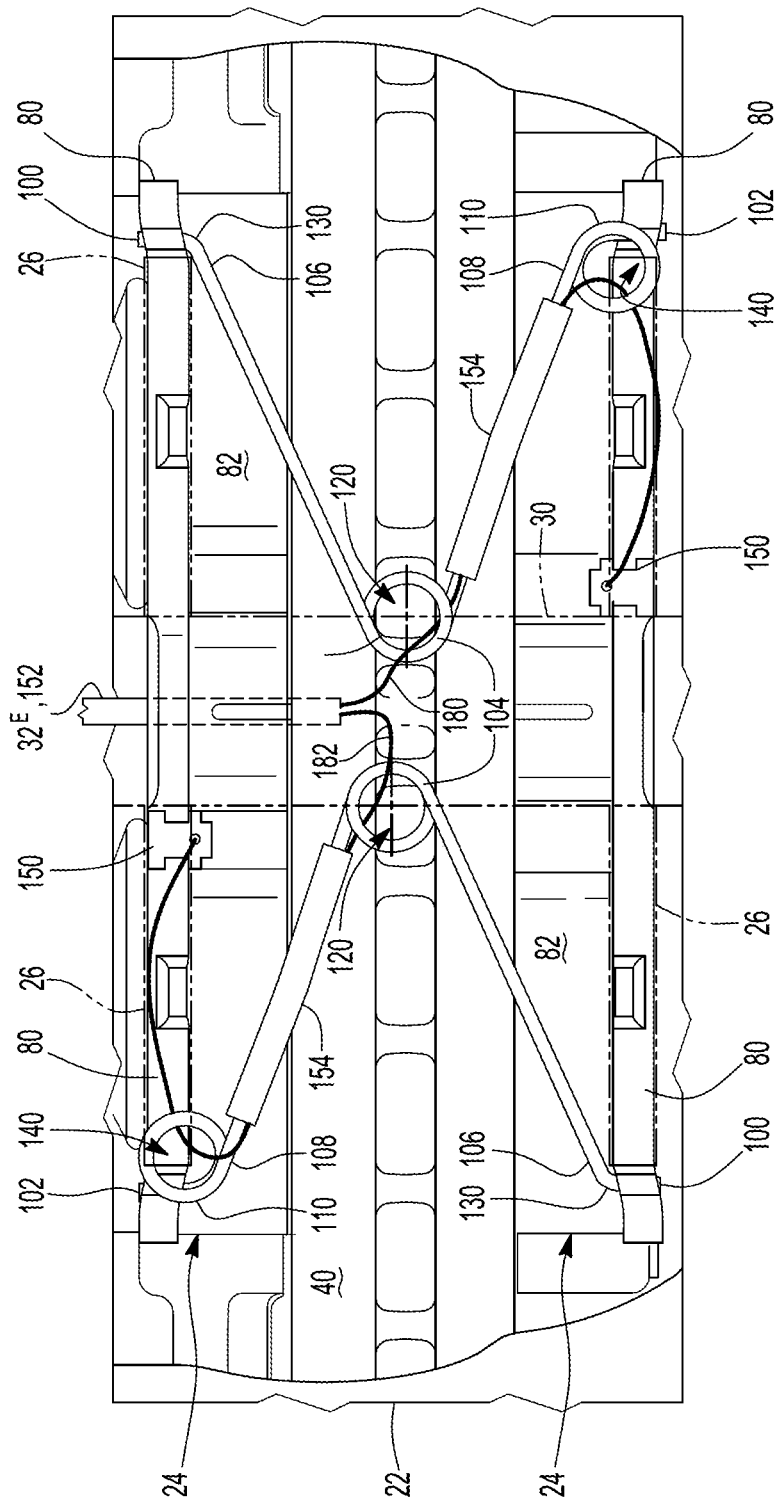

Referring to FIG. 16, a configuration of a sensor assembly $32^E$ is shown that is similar to as that shown in FIG. 15. In this configuration, the first branch 180 and the second branch 182 may pass through or may be pinched by coils 104 of different brake pad retraction springs 30. For instance, the first branch 180 may pass through the coil 104 of one brake pad retraction spring 30 and may be attached to an arm of that brake pad retraction spring 30 while the second branch 182 may pass through or may be pinched by the coil 104 of the other brake pad retraction spring 30 and may be attached to an arm of that brake pad retraction spring 30.

Figure 17:
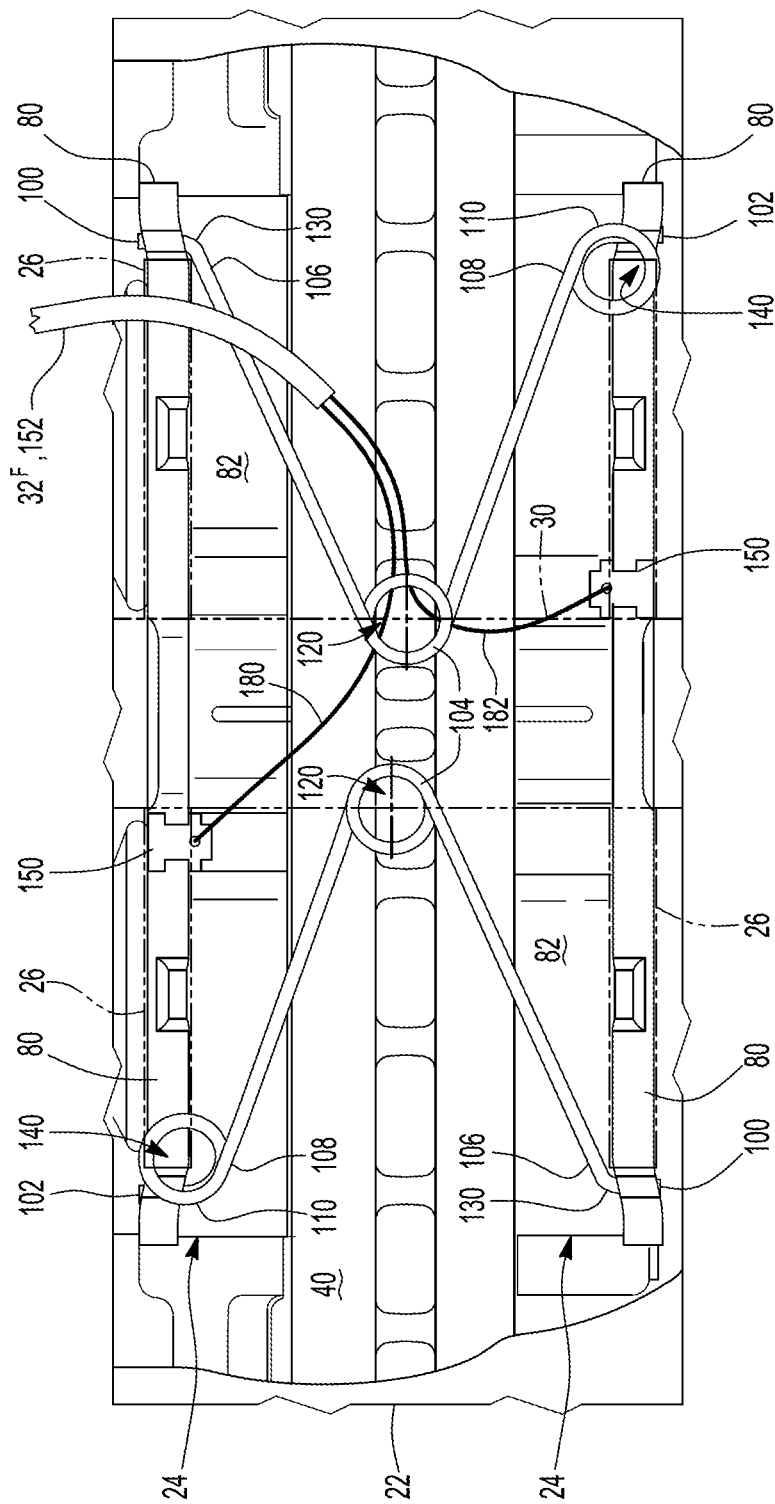

Referring to FIG. 17, a configuration of a sensor assembly $32^F$ is shown in which the wire harness 152 is attached to one brake pad retraction spring 30. For instance, the first branch 180 and the second branch 182 may be pinched and secured by the coil 104 of a brake pad retraction spring 30 in a location that may be aligned with the brake rotor 40. The first branch 180 may extend from the coil 104 to one sensor 150 while the second branch 182 may extend from the coil 104 to another sensor 150. The sensors 150 may be disposed on different brake pad assemblies 24.

Referring to FIG. 18, a configuration of a sensor assembly $32^G$ is shown in which the wire harness 152 may be twisted or tied to one or more brake pad retraction springs 30. For instance, the first branch 180 and the second branch 182 of the wire harness 152 may be twisted around or tied to the same brake pad retraction spring 30, which may be the brake pad retraction spring 30 that extends to the right of the retainer strap 28 from the perspective shown. The first branch 180 and the second branch 182 may extend to and may engage the coil 104 of the same brake pad retraction spring 30. The first branch 180 may be pinched by or may pass through the coil 104 before extending to a sensor 150. Moreover, the first branch 180 may extend to a sensor 150 without engaging the other brake pad retraction spring 30. The second branch 182 may also extend to the coil 104 of the brake pad retraction spring 30 and then may extend to the other brake pad retraction spring 30. For instance, the second branch 182 may extend from the coil 104 of the right brake pad retraction spring 30 to the coil 104 of the left brake pad retraction spring 30 from the perspective shown. The second branch 182 may be pinched by or may pass through the coil 104 of the other brake pad retraction spring 30. Then, the second branch 182 may be twisted around or may be tied to an arm of the other brake pad retraction spring 30 before extending to a corresponding sensor 150.

Referring to FIG. 19, a configuration of a sensor assembly 32$^H$ is shown that is similar to that shown in FIG. 18. In this configuration, the first branch 180 is pinched by the coil 104 of one brake pad retraction spring while the second branch 182 is pinched by the same coil 104 as well as the coil 104 of the other brake pad retraction spring.

The configurations described above may allow a brake pad retraction spring to help support and guide a wire harness of a sensor assembly. Moreover, wire harness may be routed without additional supporting components, attaching additional channels or additional components to the retainer strap or to a pad shield that may be secured by the retainer strap, thereby helping reduce cost and complexity.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake assembly comprising:
   first and second brake pad assemblies;
   a first brake pad retraction spring that extends between the first and second brake pad assemblies and that biases the first and second brake pad assemblies away from each other; and
   a sensor assembly that includes:
      a first sensor that is disposed on the first brake pad assembly; and
      a wire harness that is electrically connected to the first sensor and that is attached to the first brake pad retraction spring with an attachment feature that encircles the wire harness and the first brake pad retraction spring.

2. The disc brake assembly of claim 1 wherein the sensor assembly includes a second sensor that is disposed on the second brake pad assembly, wherein the wire harness is electrically connected to the second sensor.

3. The disc brake assembly of claim 1 wherein the first brake pad retraction spring has a coil that defines a coil hole and wherein the wire harness passes through the coil hole.

4. The disc brake assembly of claim 1 further comprising a brake caliper that defines a cavity that receives the first and second brake pad assemblies and a retainer strap that is mounted to the brake caliper and that extends across the cavity and the first and second brake pad assemblies, wherein the first brake pad retraction spring engages the retainer strap.

5. The disc brake assembly of claim 1 wherein the first brake pad retraction spring includes first and second arms that are spaced apart from each other, wherein the wire harness is attached to the first arm and the second arm.

6. The disc brake assembly of claim 1 wherein the first brake pad retraction spring includes first and second arms that are spaced apart from each other, wherein the wire harness is attached to the first arm with the attachment feature and is attached to the second arm.

7. The disc brake assembly of claim 1 wherein the first brake pad retraction spring has a coil that encircles an axis and defines a coil hole, wherein the coil has first and second coil portions that are arranged along the axis and the wire harness extends between and is pinched by the first and second coil portion.

8. The disc brake assembly of claim 1 wherein the attachment feature is a coil spring that defines a coil spring passage through which the first brake pad retraction spring and the wire harness extend.

9. The disc brake assembly of claim 1 wherein the attachment feature is a coil spring that defines a first coil spring passage through which the first brake pad retraction spring extends and that defines a second coil spring passage through which the wire harness extends.

10. The disc brake assembly of claim 1 wherein the first brake pad retraction spring includes a coil and first and second arms that extend from the coil, wherein the wire harness is attached to the first arm and the second arm.

11. The disc brake assembly of claim 1 wherein the sensor assembly includes a wireless transmitter and the wire harness extends from the first sensor to the wireless transmitter.

12. The disc brake assembly of claim 11 wherein the wireless transmitter is disposed on the first brake pad retraction spring.

13. The disc brake assembly of claim 1 further comprising a second brake pad retraction spring that extends between the first and second brake pad assemblies and that biases the first and second brake pad assemblies away from each other, wherein the wire harness is attached to the first brake pad retraction spring and the second brake pad retraction spring.

14. A disc brake assembly comprising:
   first and second brake pad assemblies;
   a first brake pad retraction spring that extends between the first and second brake pad assemblies and that biases the first and second brake pad assemblies away from each other;
   a second brake pad retraction spring that extends between the first and second brake pad assemblies and that biases the first and second brake pad assemblies away from each other
   a sensor assembly that includes:
      a first sensor that is disposed on the first brake pad assembly; and
      a wire harness that is electrically connected to the first sensor and that is attached to the first brake pad retraction spring, wherein the wire harness includes a first branch that is attached to the first brake pad retraction spring and a second branch that is attached to the second brake pad retraction spring.

15. The disc brake assembly of claim 14 wherein the first and second brake pad retraction springs each have a coil and first and second arms that extend from the coil, wherein the first branch engages the coil of the first brake pad retraction spring and is attached to the first arm of the first brake pad retraction spring and the second branch engages the coil of the second brake pad retraction spring and is attached to the first arm of the second brake pad retraction spring.

16. A disc brake assembly comprising:
   first and second brake pad assemblies;
   a first brake pad retraction spring that extends between the first and second brake pad assemblies and that biases the first and second brake pad assemblies away from each other; and
   a sensor assembly that includes:
      a first sensor that is disposed on the first brake pad assembly; and
      a wire harness that is electrically connected to the first sensor and that is attached to the first brake pad retraction spring, wherein the first brake pad retraction spring has a coil that defines a coil hole and wherein the wire harness includes a first branch that is electrically connected to the first sensor and a second branch that is electrically connected to a second sensor that is disposed on the second brake pad assembly, wherein the first branch and the second branch engage the coil of the first brake pad retraction spring.

17. A disc brake assembly comprising:

first and second brake pad assemblies;

a first brake pad retraction spring that extends between the first and second brake pad assemblies and that biases the first and second brake pad assemblies away from each other; and a sensor assembly that includes:
- a first sensor that is disposed on the first brake pad assembly; and
- a wire harness that is electrically connected to the first sensor and that is attached to the first brake pad retraction spring, wherein the wire harness includes a first branch that is electrically connected to the first sensor and a second branch that is electrically connected to a second sensor that is disposed on the second brake pad assembly, wherein the first branch and the second branch are twisted around the first brake pad retraction spring.

18. The disc brake assembly of claim 17 wherein the first branch and the second branch engage a coil of the first brake pad retraction spring.

19. The disc brake assembly of claim 18 further comprising a second brake pad retraction spring that extends between the first and second brake pad assemblies and that biases the first and second brake pad assemblies away from each other, wherein the second branch engages the second brake pad retraction spring.

20. The disc brake assembly of claim 19 wherein the first branch passes through a coil of the first brake pad retraction spring and the second branch passes through a coil of the second brake pad retraction spring.

21. A disc brake assembly comprising:

first and second brake pad assemblies;

a first brake pad retraction spring that extends between the first and second brake pad assemblies and that biases the first and second brake pad assemblies away from each other; and a sensor assembly that includes:
- a first sensor that is disposed on the first brake pad assembly; and
- a wire harness that is electrically connected to the first sensor and that is attached to the first brake pad retraction spring, wherein the first brake pad retraction spring has an anti-rotation feature that is disposed adjacent to the first brake pad assembly or the second brake pad assembly and that defines a hole, wherein the wire harness passes through the hole.

22. The disc brake assembly of claim 21 wherein the wire harness is attached to the first brake pad retraction spring with an attachment feature that encircles the wire harness and the first brake pad retraction spring.

* * * * *